Sept. 12, 1933.    J. M. PIERCE    1,926,308
TRUCK LOADING DEVICE
Filed May 18, 1931    4 Sheets-Sheet 1
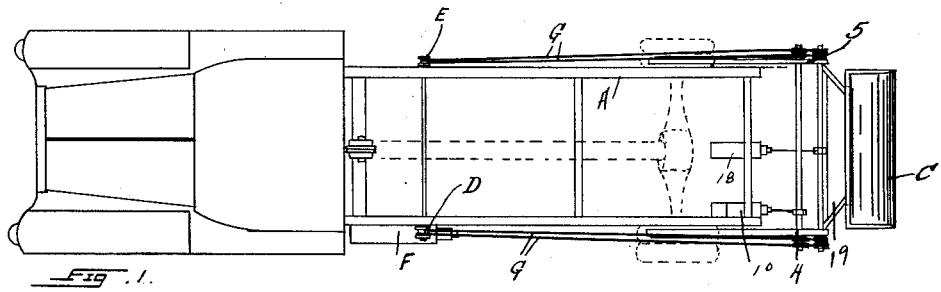
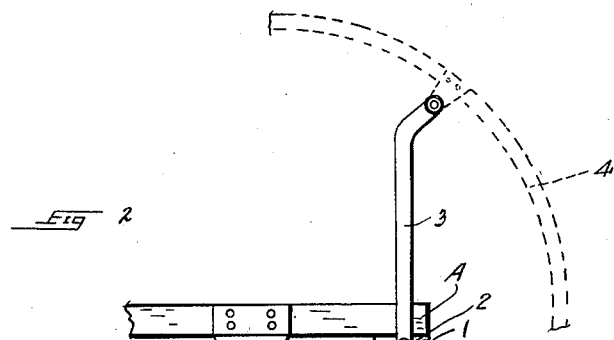
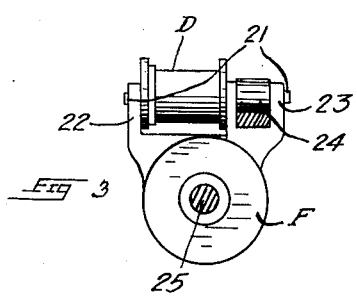 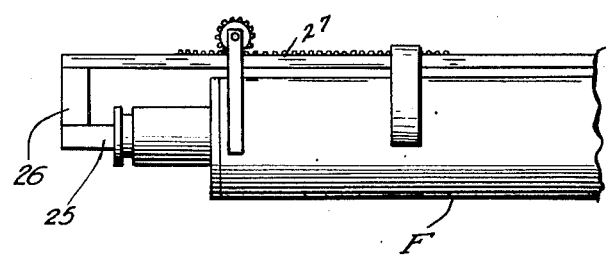
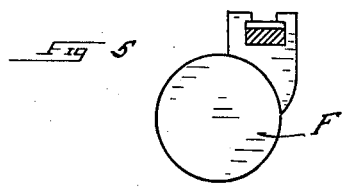
Inventor
James M. Pierce
By R. M. Thomas
Attorney Sept. 12, 1933.  J. M. PIERCE  1,926,308
TRUCK LOADING DEVICE
Filed May 18, 1931    4 Sheets-Sheet 2

Inventor.
James M. Pierce
by R. M. Thomas
his Attorney

Sept. 12, 1933.  J. M. PIERCE  1,926,308
TRUCK LOADING DEVICE
Filed May 18, 1931   4 Sheets-Sheet 3
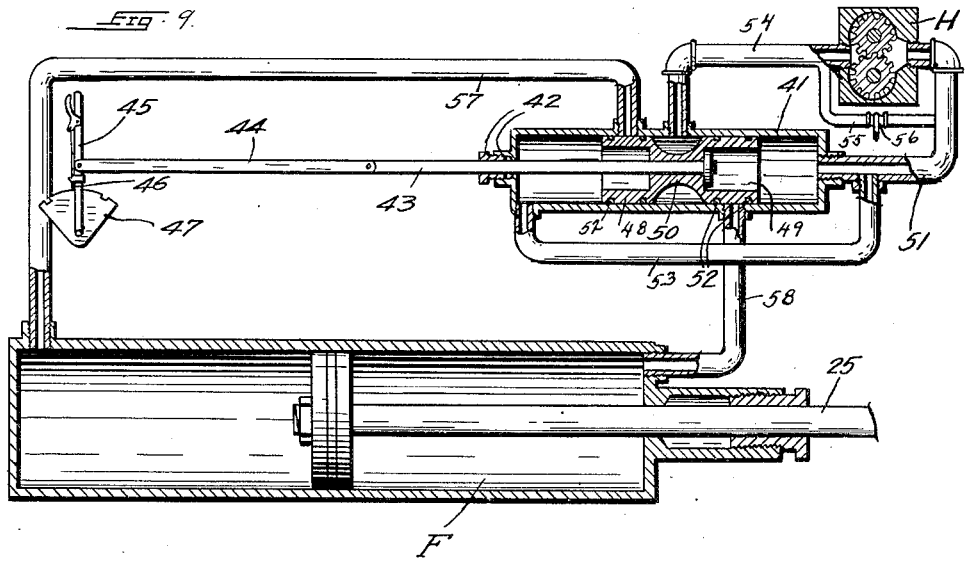
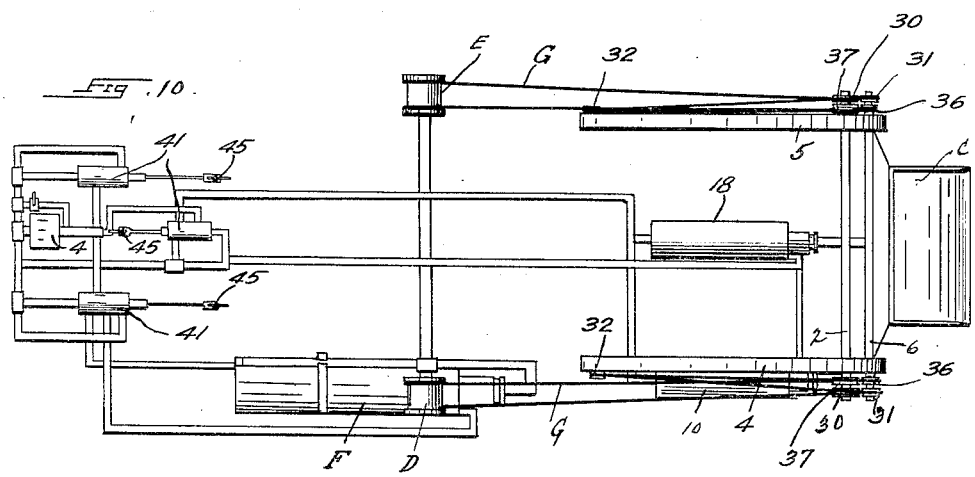
Inventor
James M. Pierce
By R. M. Thomas
Attorney

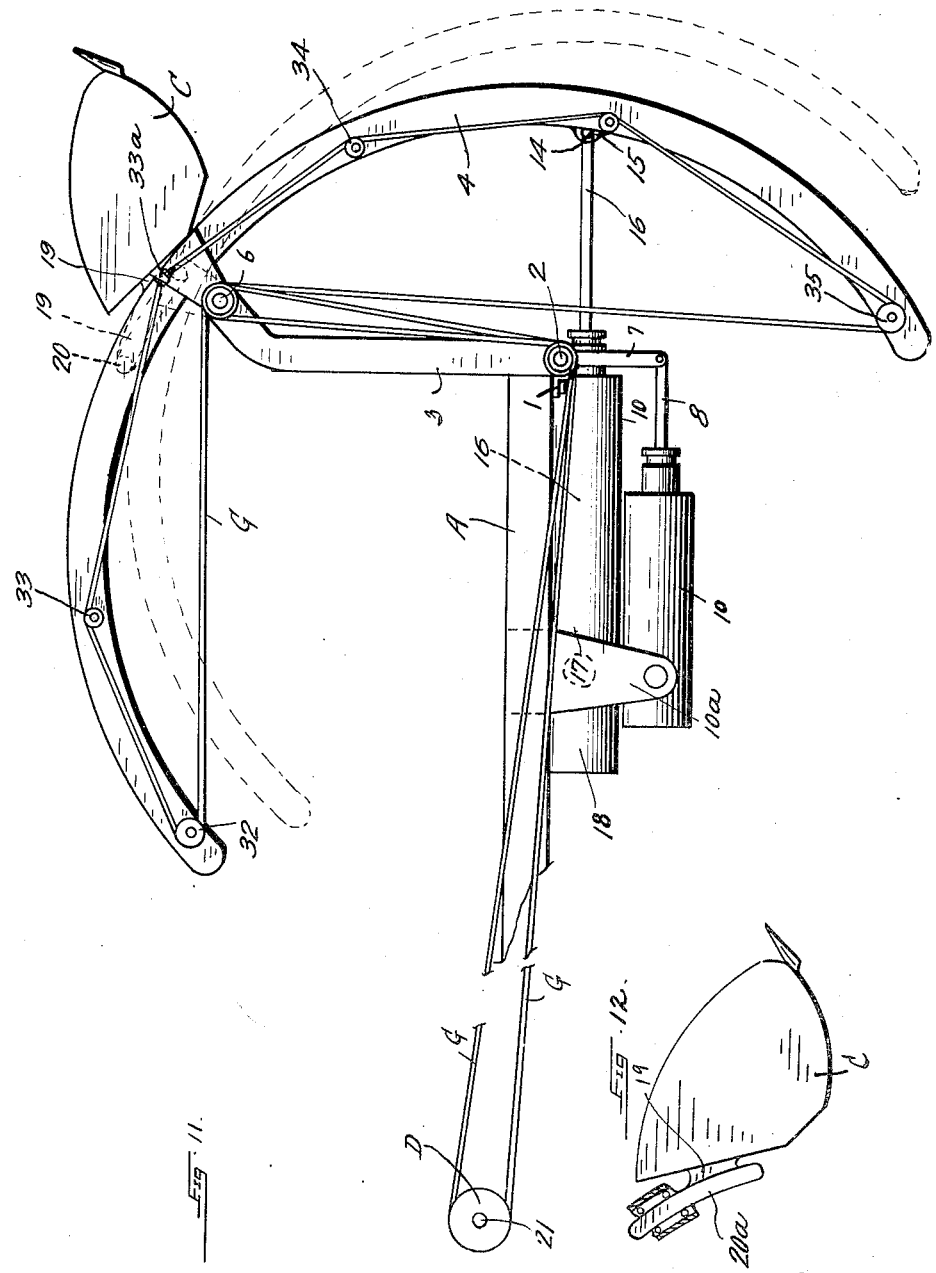

Patented Sept. 12, 1933

1,926,308

UNITED STATES PATENT OFFICE 1,926,308

TRUCK LOADING DEVICE

James M. Pierce, Ogden, Utah, assignor of one-half to Ora Bundy, Ogden, Utah

Application May 18, 1931. Serial No. 538,175

5 Claims. (Cl. 214—65)

My invention relates to trucks and has for its object to provide a new and efficient loading device for loading trucks of the dump body type from the rear end.

A further object is to provide a truck loading device which will be hydraulically operated and which will be set at the rear of the truck chassis and adapted to load the body of the truck as the truck is backed up to the material being loaded.

A still further object is to provide a loading device for trucks which will be set at the rear of the truck and which may be used to load, dig down new material for loading and to square up a cut and load the loose material into the truck body after the cut has been squared up.

A still further object is to provide a machine so designed as to allow the loader to be tilted to follow the slope of the cut or bank by manipulation of the hydraulic cylinders.

A still further object is to provide a loading device which will allow the truck to continue backing into the material as it is loaded from behind the rear wheels.

A still further object is to provide a loading device which will load the truck from the rear end and at the same time distribute the load over the truck body.

These objects I accomplish with the machine shown in the accompanying drawings in which similar numerals and letters of reference indicate like parts throughout the several views and as described in the specification forming a part of this application and pointed out in the appended claims.

In the drawings in which I have shown the best and most preferred manner of building my invention:

Figure 1 is a plan view of the chassis of a truck with my device in use thereon.

Figure 2 is a section of the rear end of the chassis showing the means of securing my truck to the rear of the truck chassis.

Figure 3 is an end view of Figure 4 parts sectioned.

Figure 4 is a side elevation of the operating cylinder for controlling the lifting cables of my device.

Figure 5 is a view of the rack bearing secured to the cylinder.

Figure 9 is a diagrammatic view of the hydraulic operating mechanism used in the device, parts shown sectioned and parts shown in elevation.

Figure 10 is a diagrammatic view of the entire hydraulic operating mechanism used on the truck.

Figure 11 is a diagrammatic view of the loader enlarged to show the movement of the tracks and the operation thereof.

Figure 12 is a view of a modified form of carriage for the scoop.

Figure 6:
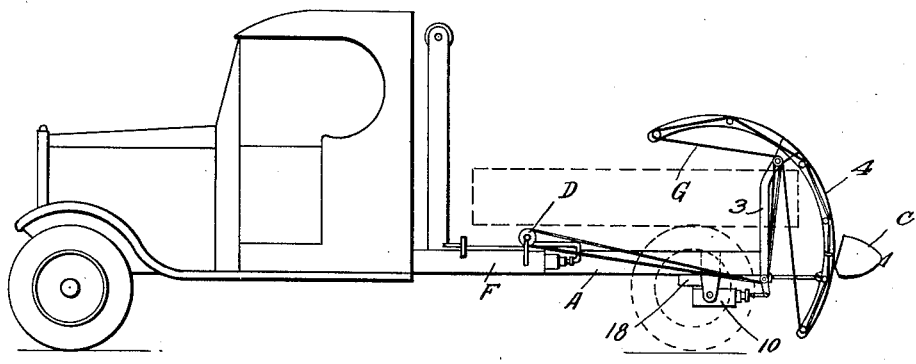
Figure 6 is a new elevation of the truck chassis, parts shown in dotted lines.
Figure 7:
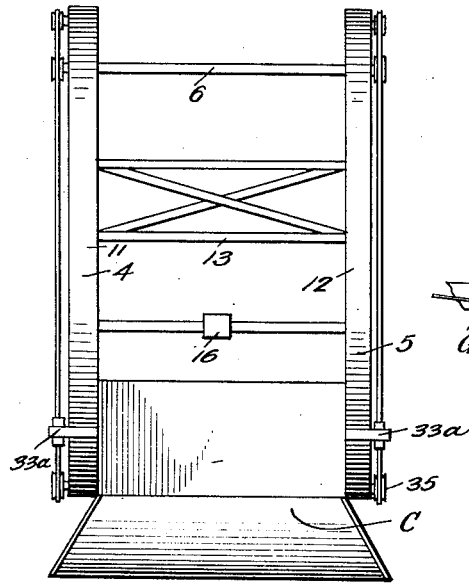
Figure 7 is a rear view of the elevating device.
Figure 8:
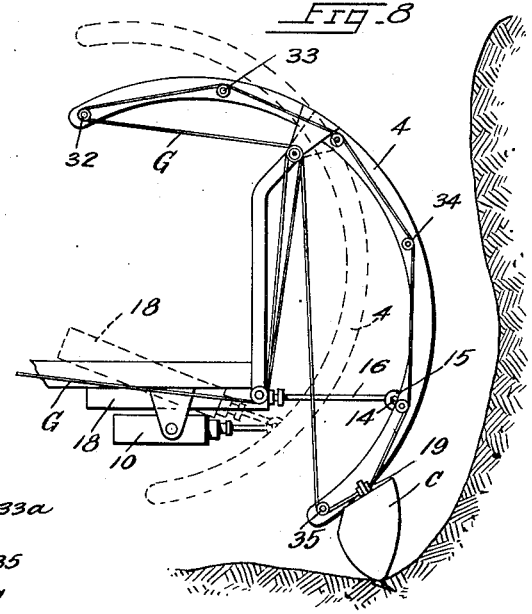
Figure 8 is a side elevation of Figure 7, showing the cables for operating the loading scoop and the cut being made by the loader.

In the drawings I have shown the truck chassis as A, and the cab as B. Onto each side stringer of the chassis I secure a bearing 1 having a cross rod 2 carried therein, said cross rod being secured to a vertical support frame 3, said frame being secured to or keyed to said rod to move when said rod is partially rotated. The top end of the frame is secured together by a cross bar 6 and spaced apart tracks 4 and 5 are pivotally carried on said cross bar or rod 6. The vertical frame 3 is provided with a depending lever 7 formed integral therewith and extending downwardly therefrom and the end of the lever 7 is pivotally attached to a connecting rod 8, which in turn is attached to a piston 9 in a hydraulic cylinder 10, said cylinder being pivotally supported from the chassis by brackets 10a. This provides a power means to tilt the support frame 3 in or out from the body of the truck.

The elevator tracks for the truck are made of channel irons 11 and 12 secured together by angled cross braces 13 and the channels are the tracks in which the wheels of the loading scoop are carried. The two tracks are secured together by the cross bar or rod 6 and other suitable braces. The bottom end of the tracks are secured together by a bar 14 being secured thereto by brackets 15 to secure the rod back from the tracks out of the way of the loading scoop, when the scoop is traveling up and down the tracks. The rod or bar 14 is then actuated by a connecting rod 16 which in turn is secured to a piston 17 in a hydraulic control cylinder 18, which cylinder is pivotally secured under the body of the chassis.

This construction of frame and tracks pivotally secured together and to the chassis provides a means for extending the tracks out from the chassis any desired distance and either or both cylinders may be operated as desired or necessary in loading the truck.

The tracks 4 and 5 are formed in a curved arc shape with the top ends extended inwardly along the sides of the body of the truck. The loading scoop C is carried on a carriage 19 having spaced apart rollers 20 on each side thereof, said rollers to operate in the tracks 4 and 5. The front side edge of the scoop may be provided with teeth to dig in the wall to loosen material ready for loading. A sled runner 20a may be used on the carriage instead of the rollers and when used in the track the tracks will be provided with rollers therein to allow the runners to pass freely thereover as shown in the sectioned portion of Figure 12 of the drawings.

An operating cable G is carried on a drum D, which drum is rotatably mounted on a shaft 21 carried in support bearings 22. The bearing 22 is provided with a support 23 for a pinion wheel 24, which pinion is carried on the same shaft 21 as the drum D, and the entire bearing is secured to and supported on the top side of an operating cylinder F. The cylinder has a piston operable therein and a connecting rod 25 connects the piston with an offset 26, which offset is formed on the end of a rack 27. The rack 27 is operated through the bearing 23 and meshes with the teeth of the pinion 24, rotating the pinion when the rack and piston are moved simultaneously by fluid pressure applied on either side of the piston. This rotates the drum D and winds the cable thereon and as the cable has both ends secured to the drum the drum winds one end of the cable thereon, while the other end is being unwound therefrom. The shaft 24 is extended across the chassis of the truck and a similar drum E is carried on the opposite end, and the two drums D and E rotate simultaneously, each carrying a cable G thereon with both ends attached to the drums. These cables are carried forward over sheave wheels 30 mounted on the cross bar 2, up over sheave wheels 31 mounted on the ends of the cross rod 6, back over sheave wheels 32 mounted near the top end of the tracks 4 and 5, front over guide rollers 33 mounted on the cross pieces of the tracks 4 and 5 and secured to arms 33a extending from the sides of the carriage 19 of the scoop C. The cables then extend from the arms over other spaced apart guide rollers 34 and down around sheave wheels 35 secured to the tracks near the lower end of their curve, back up over other sheave wheels 36 on the shaft 6, around other wheels 37 on the shaft 2 and back to the drums. The two ends being secured to the drums, one end winds thereon as the other unwinds therefrom, and all movements of the carriage and scoop are power controlled. The power being used to return the scoop to the loading position, at the same time using the teeth on the scoop to dig down additional material to be loaded.

All of the cylinders F, 10 and 18 are the same and they are each controlled by control valves which are all made the same, so I will describe but one of the valves.

The valves are carried in cylinders 41 having both ends closed and with a packing gland 42 in one end through which a control shift rod is passed and operated. The rod 43 is actuated by a link 44 connecting with a control handle 45 with a dog 46 thereon to fit into notches in a sector 47 to hold the rod in any desired position. The inner end of the rod is secured to sliding type piston valve members 48 and 49 spaced apart by the smaller diametered medial section 50. Each valve member is provided with spaced apart compression rings 52 carried therein in suitable grooves. Into each valve cylinder there are inlet and outlet pipes, one pipe 51 leads into one end of the cylinder from the pressure side of a gear pump H and another pipe 53 is connected to the pipe 51 and leads into the opposite end of the cylinder to introduce fluid pressure into both ends of the cylinder. A return flow pipe 54 is introduced into the cylinder medially of the travel of the valve member to carry the fluid back to the pump and complete the cycle of the oil therethrough.

A valve 56 is carried in a bypass pipe 55, said valve to control the flow through the bypass when it is desired to allow the pump to idle. Leading from the sides of the valve cylinders 41 to each end of the operating cylinders, I provide power pipes 57 and 58. Thus when the piston is in the position shown in Figure 9 the cylinder piston is not operating in either direction, but when the valve members 48 and 49 are moved to the right by the operator, actuating the lever handle 45, the pressure of the pump forces the fluid through the line 51 into the line 53 and into the end of the cylinder valve and thence through the line 57 into the end of the power cylinder, operating the piston in the cylinder, forcing the fluid from the other end of the cylinder out through the line 58, into the valve cylinder between the valve members 48 and 49 and back to the pump through the line 50.

To operate the cylinder in the opposite direction the handle 45 is merely shifted to the opposite end of the throw and oil from the pump is then forced through the line 51 into the valve cylinder and out through the line 58 into the end of the power cylinder forcing the piston in the opposite direction through the cylinder, thereby returning the oil from the other end of the cylinder through the line 57 and the line 54, back to the pump. The bypass of the pump being used only when it is desired to idle the pump and not operate either piston.

The operation of the loading scoop is as follows:

The drums are rotated in the desired direction by the cylinders, pinions etc. and the cables are wound and unwound thereon as the scoop raises in its course of travel up and around the curved tracks 4 and 5. The truck is driven up to the bank being loaded and the scoop may be used to cut down and loosen material before loading it into the truck. The scoop is then raised into the material in an arc shape, loading the scoop and loading the truck. The lower end of the tracks may be extended out into the material being loaded by actuating the cylinder 18 and forcing the lower end of the tracks outwardly. The top end of the tracks may be extended outwardly by actuating the hydraulic cylinder 10, drawing the lever 7 in and forcing the top of the frame 3 outwardly. The scoop and adjustment of the frame 3 distributes the material into the truck.

The various positions attainable are shown in Figure 11.

Having thus described my invention I desire to secure by Letters Patent and claim:

1. In a device of the class described the combination of a loading frame pivotally mounted at the rear of a truck chassis; a lever attached to the lower end of said frame; a hydraulic cylinder to actuate said lever and pivot said frame to or from said truck chassis; a valve to control the flow of fluid into said cylinder to power the cylinder in either direction; a set of spaced apart arc shaped tracks pivotally carried on the top end of said frame; a hydraulic cylinder to actuate said tracks in or out from the body of the truck; a valve to control the flow of fluid into said cylinder to power the cylinder in either direction; a scoop carried on a carriage, said carriage operable in said tracks; a hydraulic cylinder having a rack and pinion operable thereby and a drum carried on the same shaft as the pinion; a cable secured to said drum adapted to be wound onto one side of said drum as it is unwound from the opposite side; and means to connect the scoop to said cable to raise or lower the cable by reversible action of the rack and pinion with a control valve controlling the flow of fluid into the hydraulic cylinder to power the cylinder in the direction desired.

2. In a truck loader the combination of a set of spaced apart tracks pivotally mounted on a support frame, said frame being pivotally mounted to the chassis of the truck; hydraulic cylinders to move said track or said frame or both to or away from the end of the body of the truck; a carriage operable in said tracks carrying a toothed scoop; cable wound on drums: and a reversible action hydraulic cylinder rack and pinion to actuate said drums to raise said scoop to dump material into said truck body or to force the scoop down to loading position by dragging the teeth down the face of the cut being loaded.

3. In a rear loading device for loading dump trucks the combination of a set of spaced apart tracks pivotally mounted to a support frame; means to pivot said support frame from the chassis of the truck; means by hydraulic power cylinders to move said tracks in or out from said frame with similar means to move said frame in or out from the body of the truck; and a cable, hydraulically operated scoop to be moved up and down said tracks to load said truck or dig from behind said truck as desired.

4. In a rear loading device for trucks the combination of a set of spaced apart tracks secured to the chassis of said truck by a pivoted support frame to which the tracks are pivotally secured; means to operate a scoop in said tracks; and hydraulic means to raise and lower said scoop in said tracks by power and to move said tracks into or away from said chassis as desired for loading.

5. In a device of the class described the combination with a truck of a set of arc-shaped tracks doubly pivoted to the chassis of said truck a scoop mounted in said tracks; means to raise and lower said scoop in said tracks to load said truck; and means including hydraulic power to move said tracks to or away from said truck to extend the range of the device without movement of the truck.

JAMES M. PIERCE.